March 17, 1925.
P. O. KREHBIEL
1,529,657
METHOD OF MAKING REVERSIBLE FULCRUMS FOR BRAKE BEAMS
Filed June 28, 1922 4 Sheets-Sheet 1
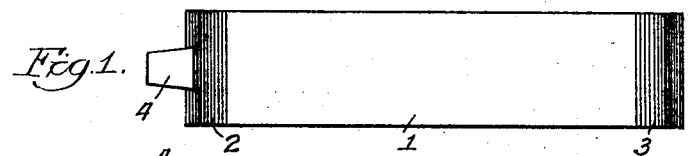
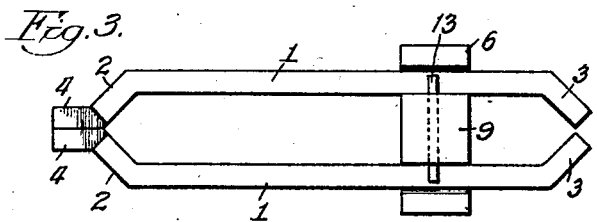
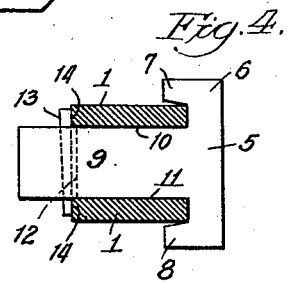
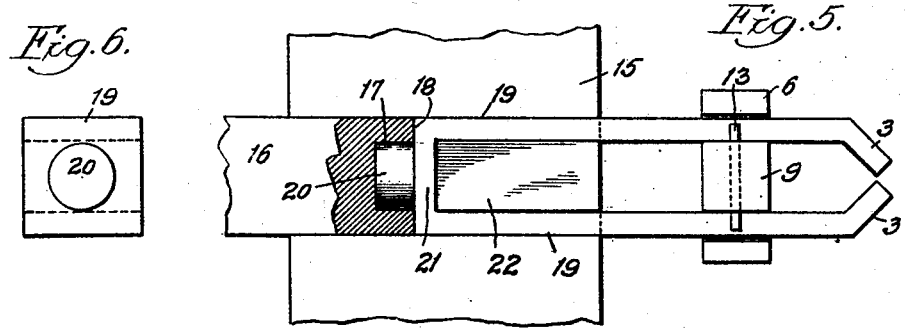
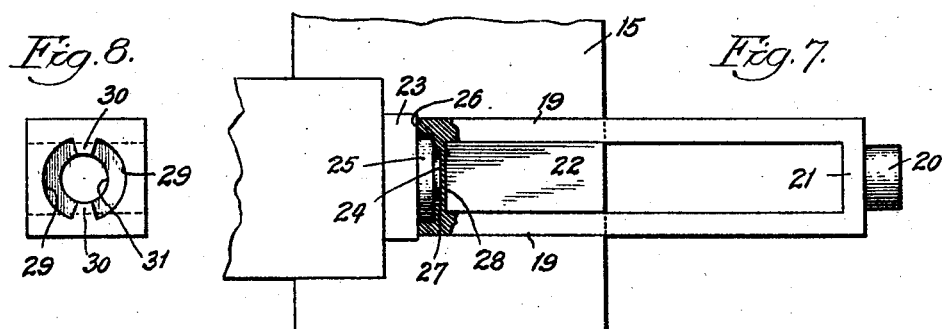
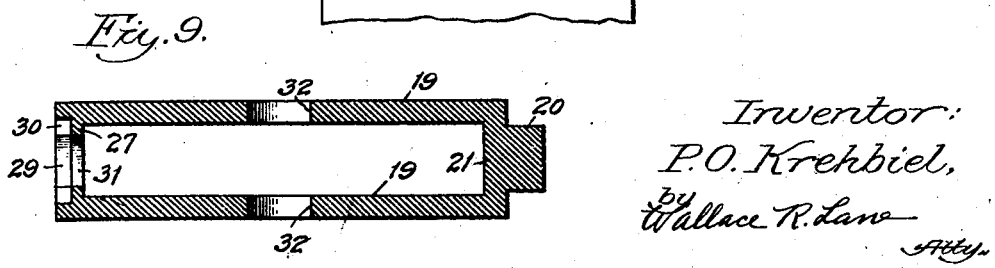
Inventor:
P. O. Krehbiel,
by Wallace R. Lane
Atty.

March 17, 1925. 1,529,657
P. O. KREHBIEL
METHOD OF MAKING REVERSIBLE FULCRUMS FOR BRAKE BEAMS
Filed June 28, 1922 4 Sheets-Sheet 2
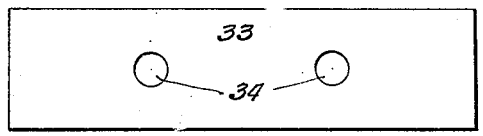
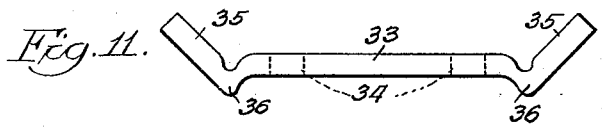
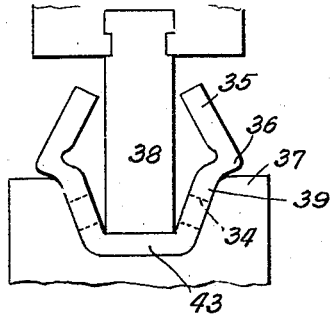
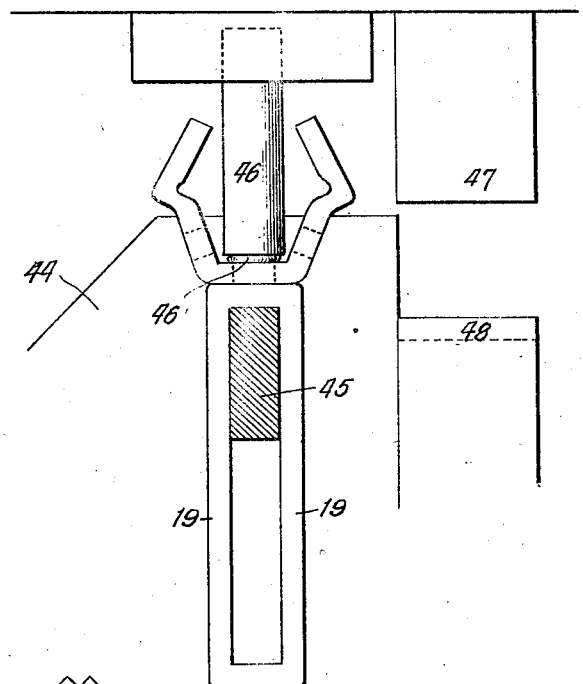
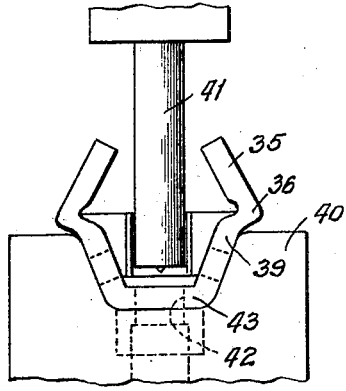
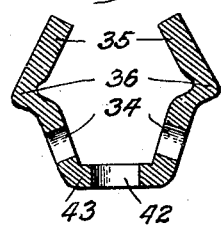
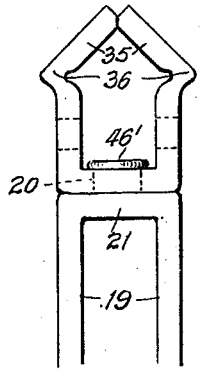
Inventor:
P. O. Krehbiel,
by Wallace R. Lane
Attys.

March 17, 1925.                                                                1,529,657
P. O. KREHBIEL
METHOD OF MAKING REVERSIBLE FULCRUMS FOR BRAKE BEAMS
Filed June 28, 1922                              4 Sheets-Sheet 3
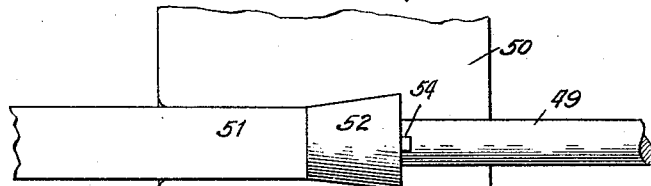
Fig. 17.
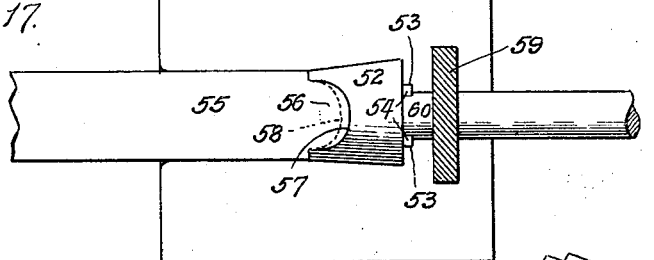
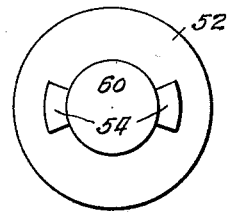
Fig. 18.
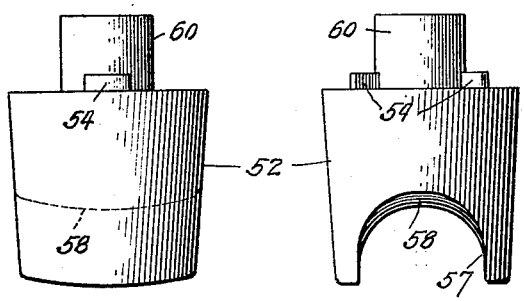
Fig. 19.    Fig. 20.
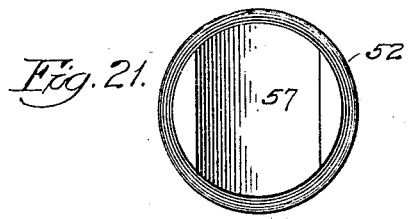
Fig. 21.
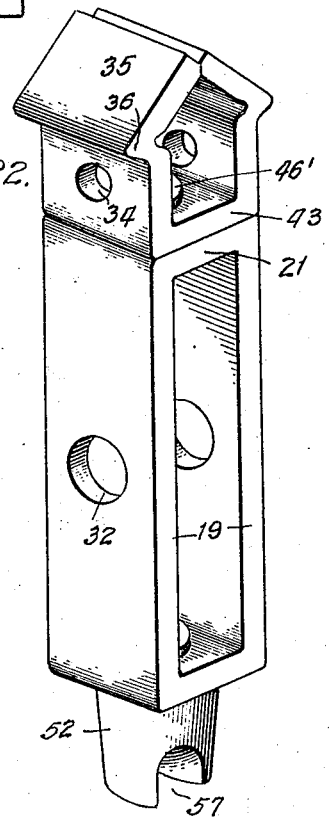
Fig. 22.
Inventor.
P. O. Krehbiel,
by Wallace R. Lane
Atty.

March 17, 1925. 1,529,657
P. O. KREHBIEL
METHOD OF MAKING REVERSIBLE FULCRUMS FOR BRAKE BEAMS
Filed June 28, 1922 4 Sheets-Sheet 4
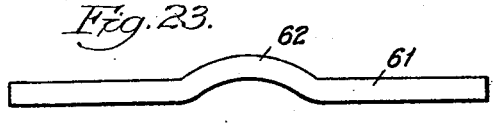
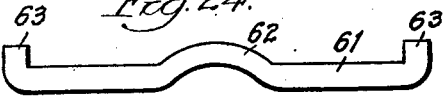
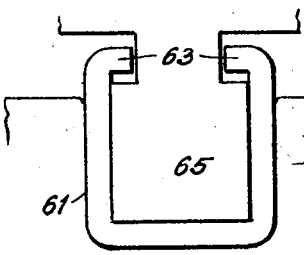
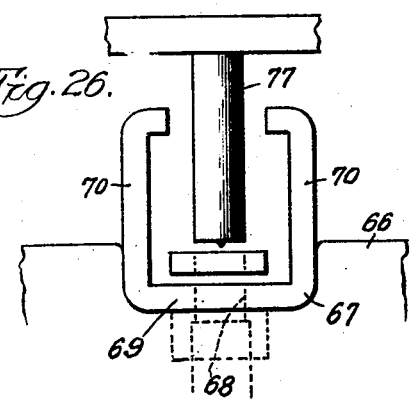
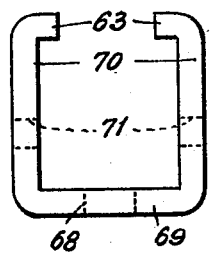
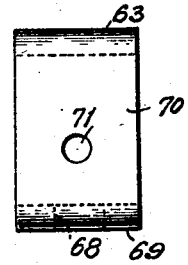
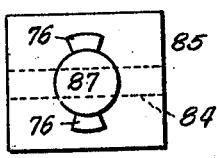
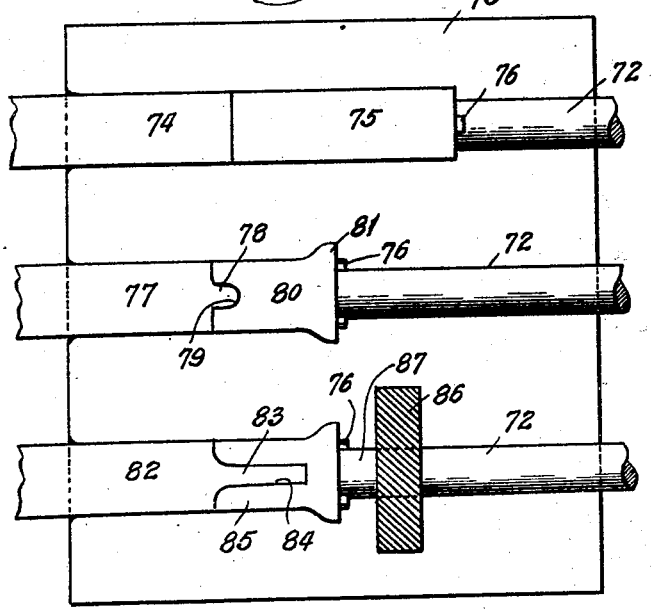
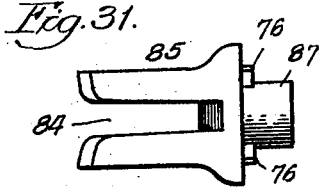
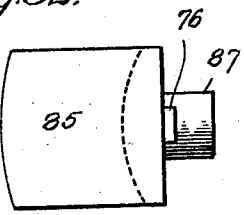
Inventor:
P. O. Krehbiel,
by Wallace R. Lane,
Atty Patented Mar. 17, 1925.

1,529,657

UNITED STATES PATENT OFFICE.

PETER O. KREHBIEL, OF CLEVELAND, OHIO, ASSIGNOR TO THE DAMASCUS BRAKE BEAM COMPANY, OF CLEVELAND, OHIO, A CORPORATION OF OHIO.

METHOD OF MAKING REVERSIBLE FULCRUMS FOR BRAKE BEAMS.

Application filed June 28, 1922. Serial No. 571,388.

*To all whom it may concern:*

Be it known that I, PETER O. KREHBIEL, of Cleveland, Ohio, have invented certain new and useful Improvements in Methods of Making Reversible Fulcrums for Brake Beams, of which the following is a specification.

The present invention relates to the method of making fulcrums for brake beams, and more particularly to the process of forming the strut, head and foot members of the fulcrum.

Among the objects of my invention are to provide an improved method of making a fulcrum of forgeable material, such as bar steel, whether of flat, round or other forms, but preferably the flat bar stock, and particularly for making the blanks for the strut and foot members of the fulcrum; to provide a method of blanking and shaping the various portions of these members by the use of suitable forging devices, such as die presses, clamping and spacing blocks, punching dies, hammers, anvils and the like; to provide a method of forming the members, including the steps of heating them to a bright red color, or to a welding heat, and to forge and weld parts of the blanks together to produce the finished product; to include the steps of forming swivel connections between the members of the fulcrum, as by forming a strut member with a swivel stud and swivel bearings, forming a head and foot members with a swivel stud and a swivel bearing respectively, and locating the studs in their respective bearings, and heading the ends of the studs to form permanent swivel connections between the strut member and the head and foot members; to head the ends of the swivel studs to the extent only that loose play will be permitted between the relatively movable swivel members; to form the juxtaposed ends of the strut member and the head member with cooperating recesses and lugs adapted to permit only a limited angular movement between the strut member and the head member, or in other words, between the brake lever supporting strut member and the relatively stationary parts of the brake beam, including the head and foot members; to provide a method of making a fulcrum by forging operations and manipulations, in lieu of casting, and thus obtain a stronger and a more durable product; and the other objects, advantages and capabilities as will later more fully hereinafter appear.

In the drawings showing the various steps of the methods forming part of this invention :—

Fig. 1 is a plan view of one of the partly forged blanks for the strut member.

Fig. 2 is a side view of the same.

Fig. 3 is a side view of a pair of blanks together with a clamping and spacing block for holding the blanks in parallel relation ready for the upsetting and welding operation at one end of the members.

Fig. 4 is an end view of the spacing and clamping block in place and showing the blanks in section.

Fig. 5 illustrates the steps of upsetting and welding one of the ends of the strut member.

Fig. 6 is an end view of the strut member after the operation of upsetting and welding.

Fig. 7 is a view illustrating the steps of upsetting and welding the other end of the strut member together with the step of forming recesses and lugs in that end of the strut member.

Fig. 8 is an end view of such end as finished by the previous steps.

Fig. 9 is a longitudinal sectional view of the strut member showing pintle apertures or bearings for the fulcrum lever.

Fig. 10 is a plan view of a sheared and die punched blank used for forming the foot member of the fulcrum.

Fig. 11 is a side view of the same blank after passing through a forming operation for bending the end portions thereof.

Fig. 12 is a view of a forming die and the blank undergoing a further bending to provide intermediate bent portions.

Fig. 13 is a similar view showing a punching operation for providing a swivel bearing in the blank.

Fig. 14 is a sectional view taken through the blank as it is removed from the die shown in Figure 13.

Fig. 15 shows the step of heading over the pivot stud of the strut member in connection with the foot member just prior to the finishing bending of the foot member.

Fig. 16 is a view of the foot end of the fulcrum having the foot member in closed form and pivoted to the strut member.

Fig. 17 shows the steps of forming the head member from a bar stock in the gripper jaws of a die press, the first step of forming the head and lugs thereon being shown in the upper part of the figure, and of forming the tension rod slot and cutting off the rod stock, in the lower half of the figure.

Fig. 18 is an end view of the head member after being severed from the rod.

Figs. 19 and 20 are side views of the same.

Fig. 21 is another end view of the same showing the form of the tension bar slot.

Fig. 22 is a view of the finished product after passing through the process forming the part of this invention.

Fig. 23 is a side view of a blank, partly formed, for making a modified form of foot member.

Fig. 24 is a similar view showing a further forming of the blank with bent ends.

Fig. 25 is a similar view showing a further forming of the blank to a generally square formation.

Fig. 26 is a similar view showing the punching operation of the swivel bearing in the foot member.

Fig. 27 is a side view of the foot member, provided with clip bolt holes in the side limbs of this member.

Fig. 28 is an end view of the same.

Fig. 29 is a view of a gripper jaw press showing three steps of operating upon a modified form of head, the first step of upsetting the end of a rod stock being shown in the upper part of the figure, the second step of shaping the head, providing a short slot in the end of the head, being shown in the middle part of the figure, and the combined steps of finishing the length of the slot and cutting off the rod being shown in the lower part of the figure.

Fig. 30 is one end view of the finished modified head member.

Figs. 31 and 32 are side views of the same.

Referring now more particularly to the drawings and having special reference first to Figs. 1 to 9 inclusive, illustrating the steps of making the strut member of the fulcrum, the first steps of the process involve the use of a piece of flat rod or bar stock of forgeable metal, such as steel, of indefinite length and placing the same in a heating furnace where the bar stock is heated to a bright red heat or color. The bar is then placed between the dies of a forging press where it is sheared and formed into the shape shown in Figs. 1 and 2 of the drawings so that the blank 1 has bent end portions 2 and 3 and a narrow tongue portion 4 extending longitudinally from one bent end portion 4. The purpose of the end portions 2 and 3 is to provide cross bars which integrally unite the longitudinal portions of the blanks 1, which then constitute side arms of a frame-like strut member; and in order to afford an ample mass of metal at the ends of the struts so developed, the bent portions 2 and 3 together constitute a dimension substantially greater than the distance between the side arms, for which reason the bending of said ends relatively to the blanks 1 is substantially less than a right angle, and leaves said ends in positions to relatively converge and stand in the relation of toggle members, which facilitates welding them together and developing the desired mass of metal as the ends of the strut are forged. Two of these blanks 1 are placed together with the tongues 4 located in lateral contact with each other and with the bent ends 3 located adjacent to each other. The blanks 1 are held in spaced parallel relation by means of a clamping block 5 having a head portion 6 provided with rearwardly extending flanges 7 and 8 and a shank portion 9 of square cross section. The blanks 1 are placed against the opposite faces 10 and 11 of the shank 9 in between said shank 9 and the flanges 7 and 8. Remote from the head 6 the shank 9 has a key slot 12 in which is driven a wedge-shaped key 13 adapted to bear against the outer edges 14 of the blanks 1 in order to firmly clamp the same in position upon the clamping block 5. This assembly is then inserted into a furnace and the tongues 4 together with the bent portions 2 are heated to a welding heat. The assembly is then inserted in a die press 15 conventionally shown in Fig. 5 and the end and tongue portions 2 and 4 are subjected in the direction of the longitudinal axis of the strut to the action of a heading tool 16 having a cylindrical cavity 17 and a flat end portion 18, to upset the inclined portions 2 and tongues 4 whereby the portions 2 will lie perpendicular to the side arms 19 of the strut member, and to form the tongues 4 into a cylindrical stud 20 and at the same time welding the parts 4 and 4 and parts 2 and 2 together to form the stud 20 and the cross bar 21 integrally and as integral parts of the strut member. The die press has a spacing block or anvil 22 which fits into the slot formed between the arms 19 of the strut member, to hold the arms 19, 19 spaced and to also cooperate with the heading tool 16 to weld and form the parts 2, 2 into the cross bar 21. This end of the partly complete strut member is now of generally rectangular shape, as clearly shown in Fig. 5 of the drawings. The clamping block 5, together with a key 13 is then removed and the partly formed strut placed in the furnace to heat the opposite ends 3, 3 thereof to a welding heat, after which the assembly is again placed in the die press over the anvil 22 with the ends 3, 3 located between the end of the anvil 22 and a heading tool 23. This tool has a cylindrical end portion 24, arc shaped intermediate portions 25 and a flat ended shank 26. As the ends 3, 3 are subjected to the action of this heading tool the ends 3, 3 are formed and welded together to form the cross bar portion 27 perpendicularly to the side arms 19, and with a central recess and arc shaped recesses 29 providing inwardly extending lugs 30 between the ends of the recesses 29, as the end of the heading tool is forced into place. This leaves a web portion 28 in the cross bar 27, which is later punched out by a suitable punch in a punch press to convert the central recess into an aperture 31 forming the swivel bearing for the strut member. The strut is now removed from the forging press and placed in the punch press where pintle bearings 32 are formed in the side arms 19 of the strut member. The strut member is now complete, of generally rectangular shape and has two parallel side arms providing a longitudinal slot therebetween for the movement therein of the usual brake beam lever. Such brake lever usually has a pintle extending laterally from both sides of the lever into the aligned bearings 32 formed in the arms of this strut.

Referring now more particularly to Figures 10 to 16 inclusive of the drawings, the foot member is constructed from a flat steel bar stock by first heating the bar in a suitable furnace to a bright red heat. When so heated the bar is inserted in a combination shearing and punching die press, whereby the bar is cut off to form a blank 33 and at the same time is punched with a pair of spaced holes or apertures 34 serving as openings for a clip bolt which is used for holding the foot member to the compression bar of the brake beam. The blank is again placed into the furnace and heated again to a bright red heat, after which it is pressed between forming dies so as to bend up the end portions 35 of the blanks to form stepping members with knees 36, as shown in Fig. 11 of the drawings. The blank is then, without reheating, transferred to the next die 37 of the die press and further bent or formed thereby and by a die 38 to develop bent intermediate portions 39, all as clearly shown in Fig. 12 of the drawings. This is done by placing the blank shown in Fig. 11 of the drawings over the recessed die 37 and forcing the blank inwardly into the recess by means of the die 38, the lower end of the latter being flat so as to maintain the middle section 43 of the blank in flat form and suitable to be punched as at 42, in completing the swivel seat shown in Fig. 14 of the drawings. In placing the piece 33 over the die 37, the knees 36 engage the corners of the die and thereby center the piece 33 over the die and insure symmetrical relationship of swivel seat 43 to the bolt holes 34 as well as alignment of said bolt holes in the finished foot piece. It will be noted that the blank is yet in open form. This is for the purpose of enabling one to place into the blank a punching die 40 so that the die 41 will punch out an aperture 42 in the central section 43 of the blank 33. The aperture forms a swivel bearing for the swivel stud 20 on the strut member shown in Figs. 5, 6, 7 and 9 of the drawings.

The next step is to attach the foot piece to the swivel stud end of the strut member. The previously formed strut member is placed upon a forging press 44, having an anvil 45 fitting within the elongated slot provided between the arms 19 of the strut member. The foot piece is then located upon the upper end of the strut member so that the stud will project upwardly through the aperture 42 of the foot piece. The upper end of the strut stud 20 is then headed by a rivet heading tool 46, to form a head or flange 46', as shown in Fig. 17 of the drawings. The heading action is limited to the extent of leaving just sufficient loose play between the flange 46 and the central portion 43 of the foot member so that the strut member and the foot member may freely swivel about the longitudinal axis of the strut member. The connected strut and foot members are then placed between the jaws 47 and 48, with the knees 36, 36 between such jaws, such that upon the relative approach thereof, the jaws 47 and 48 will press the ends 35, 35 in contact with each other. In this way the foot member is brought into closed formation as shown in Fig. 16 of the drawing.

Referring now more particularly to Figs. 17 to 22 inclusive, the method of forming the head member from a round steel bar stock is shown. The bar stock 49 is first heated in a suitable furnace to a welding heat and is then placed into a pair of gripper jaws of a die press 50. The die between the gripper jaws has a frusto-conical cavity and space for the rod 49 and a heading tool 51. This tool operates to force back an end portion of the heated rod so as to form the frustum of a cone 52 and at the same time to also cause some of the metal to flow into recesses 53 in order to form lugs 54 integral with the head 52 without reheating. This partly completed head is then turned 90° to eliminate flash and then placed into another pair of cavities in the gripper jaws of the press and a second heading tool 55 having a beaded head 56 is forced against the head 52 to provide a cross slot 57 therein as shown in Figs. 17, 19, 20 and 21. This cross slot has a crest 58 formed to fit into the bend of the tension rod of the brake beam. At the same time that the slot 57 is being formed, a shearing cutter 59 operates to shear off the rod 49 at a suitable distance from the rear end of the head 52 to provide a swivel stud 60, as shown in Figs. 17, 18, 19 and 20.

For the purpose of joining the strut and head members together the strut member is again placed in a forging press so that the apertured end of the strut is positioned upon an anvil and the head member located with the stud 60 thereof extending into the swivel aperture 31 formed in the end of the strut member. The end of the swivel stud 60 is then headed over in the same manner as when the foot member was attached to the other end of the strut member. The heading of the stud is to the extent only to permit the free swiveling action between the head and the strut members, as in the case of the foot and strut members.

Fig. 22 shows the fulcrum in complete form ready to be applied to the remainder of the brake beam structure.

Referring now more particularly to Figs. 23 to 28 of the drawings, a foot piece of modified form, shown, is constructed by first heating a flat bar stock of steel to a bright red heat in a suitable furnace. The bar is then placed into a combination shearing and forming die where it is cut to the desired length and formed to produce the blank 61 shown in Fig. 23 of the drawings. This is a flat blank with a central bent up portion 62. Without reheating the blank it is transferred into the next compartment of the same die and formed with bent end portions 63, as shown in Fig. 24 of the drawings. Without reheating it, the blank, as shown in Fig. 24, is then transferred to a die press having dies 64 and 65, where the blank is further changed in form to that shown in Fig. 25 of the drawings. This die 65 flattens the portion 62, as shown in Fig. 25 of the drawings. The blank is then placed into a die 66 having a depression 67 to receive the lower portion of the blank 61. A punching die then operates to punch out a hole 68 in the bottom portion 69 of the blank. The hole forms the swivel bearing for this foot member in the same way as the bearing 42 forms a swivel bearing in the foot member shown in Figs. 13 and 14 of the drawings. The side legs 70 of the foot piece are then provided with gauged or alined apertures 71 for the purpose of receiving a clip bolt. These apertures may be formed by punching out the holes 71 on a suitable die press. This foot piece may be attached to the strut member in the same manner as the foot piece shown in Fig. 13 was attached to the strut member. This type of foot piece is used with a brake beam pressure bar of channel or I-section. The clip bolt passing through the openings 71 will hold legs 70 in permanent connection with the pressure bar of the brake beam.

In Figures 29 to 32 inclusive is shown a modified form of head piece, which is connected to the strut member in lieu of and in the same manner as the head piece shown in Figs. 17 to 21 was attached to the strut member. This head piece is formed from a round steel bar stock 72 which is first heated in a furnace to a welding heat. This heated bar 72 is then placed in the gripper jaw cavities of a forging press 73 and then upset by a heading tool 74 to form a head portion 75 of generally cylindrical formation of larger diameter than the bar 72 and also provided with longitudinally extending arch shape lugs 76, the jaws of the die press being suitably formed with recesses to form these lugs. The bar is then turned at about 90° in order to eliminate the flash, and is then placed into a second set of gripper jaws in the die press 73 and subjected to the force of a second heading tool 77. This tool has at its end a head 78 which forms a cross slot 79 in the end of the head portion 80 and also causes the rear end 81 of the head portion to be outwardly flared, as shown in Fig. 29 of the drawings. This second forming is carried on without reheating the bar. Without again reheating the bar it is placed into a third set of gripper jaws of the die 73 and is then subjected to a third heading tool 82 having a long tang 83 operating to elongate the slot 84 in the head 85. At the same time a shearing blade 86 operates to cut the remaining portion of the rod from the head and to leave a length of rod 87 to provide for a swivel stud. The head is then connected to the strut member by upsetting the end of the stud 87 in the same way as in the case of the head shown in Figs. 18, 19, 20 and 21 of the drawings.

It is to be understood that while I have herein disclosed and illustrated upon the drawings specific methods of carrying out my invention and producing preferred and modified embodiments of the members of the fulcrums it is to be understood however that the specific description as herein made and the specific illustration upon the drawings are not to be regarded as limiting my invention but that the invention may also include other modes of forming the strut member as do not depart from the scope of the appended claims.

Having now described my invention, I claim:

1. In the art of forging struts with spaced side arms connected together at their ends, the improvement which consists in providing a pair of side arms having end portions inwardly deflected on transverse lines into positions which presents said ends in substantially the relation of members of a toggle, and then, while said ends are at welding heat, subjecting their outer faces to pressure and thereby continuing their inward deflection and causing them to weld together endwise and produce a single cross-bar integrally uniting the side arms.

2. In the art of forging struts with spaced side arms, connecting end bars and swivel studs, the improvement which consists in providing a pair of side arms having shaped end portions inwardly deflected on transverse lines causing them to assume the relation of abutting members of a toggle and with reduced projections beyond their toggle-like abutment, then applying pressure to the outer faces of said end portions through means of a die having a swivel stud cavity, and thereby continuing the inward deflection of said end portions and causing them to weld endwise into a cross-bar while admitting metal into the cavity of the die to form a swivel stud integral with said cross-bar.

3. In the art of forging struts with spaced side arms, connecting end bars and swivel studs, the improvement which consists in providing a pair of side arms having shaped end portions inwardly deflected on transverse lines causing them to assume the relation of abutting members of a toggle and with reduced projections beyond their toggle-like abutment, then applying pressure to the outer faces of said end portions through means of a die having a swivel stud cavity, and thereby continuing the inward deflection of said end portions and causing them to weld endwise into a cross-bar while admitting metal into the cavity of the die to form a swivel stud integral with said cross-bar; the swivel stud cavity in said die being proportioned to receive not only said projections but also surplus metal from the deflected end portions and thereby form a swivel stud with enlarged dimensions.

4. In the art of forming a strut with a foot swiveled thereto, the improvement which consists in bending a piece of metal stock upon itself to provide a swivel base and a pair of stepping members extending therefrom, the ends of the stepping members being left spaced apart, then assembling the swivel base of the foot member with the strut member through means of a swivel stud and perforation, and then introducing a pressure tool between the spaced ends of the foot member to head the swivel stud.

5. In the art of forming a strut with a foot swiveled thereto, the improvement which consists in bending a piece of metal stock upon itself to provide a swivel base and a pair of stepping members extending therefrom, the ends of the stepping members being left spaced apart, then assembling the swivel base of the foot member with the strut member through means of a swivel stud and perforation, then introducing a pressure tool between the spaced ends of the foot member to head the swivel stud, and finally pressing together the spaced ends of the stepping members.

6. In the art of producing reversible fulcrums with forged foot members swiveled thereto, the improvement which consists in providing a foot member blank, punching said blank to provide clip bolt openings, pressing said blank to provide a swivel base between said openings and to deflect the ends of the blank as stepping members extending from said swivel base, then introducing a tool between said stepping members and punching a swivel stud opening in said base, then assembling the foot member with the fulcrum member by placing the last-named opening over a swivel stud, then introducing a heading tool between the stepping ends to form a head upon the swivel stud, and finally bringing the stepping ends together and aligning the clip bolt openings.

7. In the art of producing fulcrums with foot members swiveled thereto, the improvement which consists in forging a piece of metal stock to bend it upon itself and form a swivel base with spaced stepping members projecting from said swivel base, then introducing a punch between said stepping members to form a swivel perforation in said swivel base, then assembling the swivel base with the strut member through means of a swivel stud, and then introducing a heading tool between the spaced ends of the stepping members and heading said swivel stud.

8. In the art of forming a swivel foot for a brake-beam fulcrum, the improvement which consists in shaping a piece of metal stock to provide a blank with stepping ends and with knees between said stepping ends and the body of the blank, then centering the blank so formed over a shaping die by fitting the die between the knees and then pressing the blank between said die and a coacting die and providing a swivel seat symmetrically related to said stepping ends and knees.

9. In the art of forming a swivel foot for a brake-beam fulcrum, the improvement which consists in punching and shaping a piece of metal stock to provide a blank with stepping ends, with knees between said stepping ends and the body of the blank, and with bolt holes symmetrically related to the respective knees, then centering the blank so formed over a shaping die by fitting the die between the knees and then pressing the blank between said die and a coacting die and providing a swivel seat symmetrically related to said stepping ends and knees and bringing said bolt holes into alinement.

In witness whereof, I hereunto subscribe my name to this specification in the presence of two witnesses.

PETER O. KREHBIEL.

Witnesses:
O. E. ADAMSON,
P. L. MAHER.